United States Patent
Takeuchi

(10) Patent No.: US 9,661,224 B2
(45) Date of Patent: May 23, 2017

(54) IMAGE SHAKE CORRECTING APPARATUS AND CONTROL METHOD THEREFOR, OPTICAL APPARATUS, AND IMAGE PICKUP APPARATUS

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 54 days.

(21) Appl. No.: 14/558,929

(22) Filed: Dec. 3, 2014

(65) Prior Publication Data
US 2015/0172548 A1    Jun. 18, 2015

(30) Foreign Application Priority Data

Dec. 12, 2013 (JP) ................. 2013-257051

(51) Int. Cl.
| | |
|---|---|
| H04N 5/228 | (2006.01) |
| G03B 17/00 | (2006.01) |
| G02B 27/64 | (2006.01) |
| H04N 5/232 | (2006.01) |
| G02B 7/10 | (2006.01) |

(52) U.S. Cl.
CPC ......... *H04N 5/23258* (2013.01); *G02B 7/102* (2013.01); *G02B 27/646* (2013.01); *H04N 5/23261* (2013.01); *H04N 5/23287* (2013.01)

(58) Field of Classification Search
CPC .............. H04N 5/23248–5/2329; G03B 2205/0007–2205/0038; G02B 27/646

USPC ............ 348/208.99–208.16, 219.1; 396/13, 396/52–55; 359/554–557
See application file for complete search history.

(56) References Cited

U.S. PATENT DOCUMENTS

| | | |
|---|---|---|
| 7,590,336 B2 | 9/2009 | Higo |
| 8,681,229 B2 | 3/2014 | Nomura |
| 9,264,615 B2 | 2/2016 | Takeuchi |

(Continued)

FOREIGN PATENT DOCUMENTS

| | | |
|---|---|---|
| JP | 2006-113264 A | 4/2006 |
| JP | 2010-004370 A | 1/2010 |
| JP | 2011-118073 A | 6/2011 |

*Primary Examiner* — Xi Wang
(74) *Attorney, Agent, or Firm* — Fitzpatrick, Cella, Harper & Scinto

(57) ABSTRACT

This image pickup apparatus detects a shake and performs feedback control. A LPF and a subtracting unit divide a detection signal into low-frequency components and high-frequency components. An output of the LPF for integrating the high-frequency components and the LPF for integrating the low-frequency components are combined in an adding unit to output the result as the target position of the correcting lens. A HPF removes the low-pass components of the shake amount applied to the image pickup apparatus. A control switching determination unit switches a first control mode for performing an image shake correction by a signal produced by frequency dividing a signal after processing signal with the HPF, and a second control mode for performing the image shake correction by a signal that is generated by subtracting a fixed offset amount calculated with the HPF based on the shake signal and dividing the result into the frequency components.

17 Claims, 12 Drawing Sheets

(56) References Cited

U.S. PATENT DOCUMENTS

| | | | |
|---|---|---|---|
| 2004/0189815 A1* | 9/2004 | Kumaki | G01C 19/5776 348/208.99 |
| 2006/0083502 A1 | 4/2006 | Higo | |
| 2009/0160952 A1* | 6/2009 | Nakakuki | H04N 5/23248 348/208.4 |
| 2009/0160956 A1* | 6/2009 | Yumiki | G03B 5/00 348/208.11 |
| 2009/0180769 A1* | 7/2009 | Mizuta | G03B 17/00 396/55 |
| 2009/0316010 A1 | 12/2009 | Nomura | |
| 2010/0260493 A1* | 10/2010 | Kato | G02B 27/646 396/55 |
| 2010/0265341 A1* | 10/2010 | Hirayama | H04N 5/23248 348/208.1 |
| 2010/0272423 A1* | 10/2010 | Ohara | G03B 17/00 396/55 |
| 2011/0102612 A1* | 5/2011 | Iwata | G03B 5/00 348/208.11 |

* cited by examiner

IMAGE SHAKE CORRECTING APPARATUS AND CONTROL METHOD THEREFOR, OPTICAL APPARATUS, AND IMAGE PICKUP APPARATUS

BACKGROUND OF THE INVENTION

Field of the Invention

The present invention relates to a technique for correcting an image shake in an optical apparatus, an image pickup apparatus or the like.

Description of the Related Art

An image shake can be caused on an image captured by an image pickup apparatus such as a digital camera by a shaking of a user's hand which holds a camera main body when capturing the image. Therefore, there have been some apparatuses with a function for detecting vibration applied to the camera main body to correct the image shake of an object image. In this technique, optical image shake correction processing and electronic image shake correction processing are known. The optical image shake correction processing detects a shake of a camera main body with an angular velocity sensor or the like to move an optical member in a photographing optical system (a correcting lens) to change a direction of an optical axis in the photographing optical system. Thereby, the image focused in a light receiving plane of an imaging element can be moved to correct the shake. Also, the electronic image shake correction processing is processing for artificially correcting the image shake by performing image processing on a captured image.

A shake detection signal output from the angular velocity sensor or the like comprises a signal caused by the vibration such as a hand shaking that should be corrected. In addition, the shake detection signal comprises a signal or the like caused by an operation of a camera according to a photographer's intension, such as a panning operation. Thereby, when the correcting lens is driven based on only the shake detection signal, an image shake correction is performed on a large shake, for example, during a panning or a tilting operation (hereinafter referred to as a "panning operation or the like"). Therefore, a target position of the correcting lens may be greater than a movable range thereof. Alternatively, an image-swing (swing-back) can occur after the panning operation or the like to cause the user to feel discomfort about the operation of the camera or the image. A Processing for the correcting the swing-back stops the image shake correction if the shake detection signal of the angular velocity sensor is determined to be caused by the panning operation or the like. The correcting lens is returned to the center of the movable range (a reference position that has a no displacement) and stopped.

In this connection, the shake detection signal may not be 0 exactly, but asymptotically close to 0 due to a residue signal or the like of a high-pass filter (HPF) or an integrator of a detection signal processing system when some rapid changes of the angle velocity signal occur at the end of the panning operation or the like. Therefore, when the image shake correction is resumed, the correcting lens is moved significantly by the shake detection signal to cause the swing-back of the image. To solve the problem, Japanese Patent Laid-Open No. 2006-113264 discloses a device for correcting the image shake by gradually changing a cut-off frequency for a signal processing based filter of the angular velocity at the end of the panning operation or the like. Also, Japanese Patent Laid-Open No. 2011-118073 discloses a method for performing driving of the correcting lens by speed control depends on the angular velocity without using the HPF or a LPF (integrator) having a significantly lower cut-off frequency in the signal processing based filter of the angular velocity that results in the swing-back. Also, Japanese Patent Laid-Open No. 2010-004370 discloses a device for correcting a shake by the correcting lens based on a shake signal detected by the angular velocity sensor and correcting the shake by the electronic image shake correction based on the shake signal of the low-frequency components. Thereby, the device can ensure a sufficient drive range of the correcting lens with respect to the large shake due to the panning operation or the like.

However, the technique described in Japanese Patent Laid-Open No. 2006-113264 has a weak effect on the image shake correction immediately after the panning operation or the like. Also, in the technique described in Japanese Patent Laid-Open No. 2011-118073, because the operation in which the position of the correcting lens is centered by position control, when exposure is not being performed, the effect of the image shake correction on the low-pass components of the shake detection signal such as a swing of the user's body is weakened. Also, if the offsets of the angular velocity sensor and the temperature fluctuation are large, and the shake at a low-frequency is relatively large during photographing while walking or the like, the position of the correcting lens deviates from the center of the movable range since this technique does not use the HPF. If a crystal gyro sensor or the like with a small offset and the temperature fluctuation is used, the cost may increase. Also, the technique described in Japanese Patent Laid-Open No. 2010-004370 reduces the performance of the image shake correction for the low-frequency during the exposure if the electronic image shake correction cannot be performed.

SUMMARY OF THE INVENTION

This invention provides an image shake correcting apparatus that enables successfully performing an image shake correction if a large shake occurs at an apparatus.

According to the present embodiment, an image shake correcting apparatus for performing an image shake correction by the driving of a correcting unit is provided that includes a high-pass filter configured to remove a low-pass component of the shake detection signal; a dividing unit configured to divide a detection signal output by a shake detecting unit into a plurality of frequency components; and a controlling unit configured to comprise a first control mode for performing the image shake correction by using a signal obtained by dividing the detection signal processed by the high-pass filter by the dividing unit, and a second control mode for performing the image shake correction by using a signal obtained by dividing the detection signal not processed by the high-pass filter by the dividing unit.

The image shake correcting apparatus according to the present invention can realize a better image shake correction even if the apparatus has been subject to a large shake.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings. The present invention can be applied to an interchangeable lens mounted on a digital single-lens reflex camera, an optical apparatus such as a lens barrel, an image pickup apparatus such as a digital video camera, a monitoring camera, a Web camera, or the like, and electronic equipment including an image pickup apparatus, such as a mobile phone, a tablet terminal, or the like. Note that this invention does not intend to be limited to the following embodiments, and illustrates only a concrete example that has some advantages in the practice of this invention. Also, all the combinations of the characteristics described in the following embodiments are not always essential for the present invention.

Figure 1:
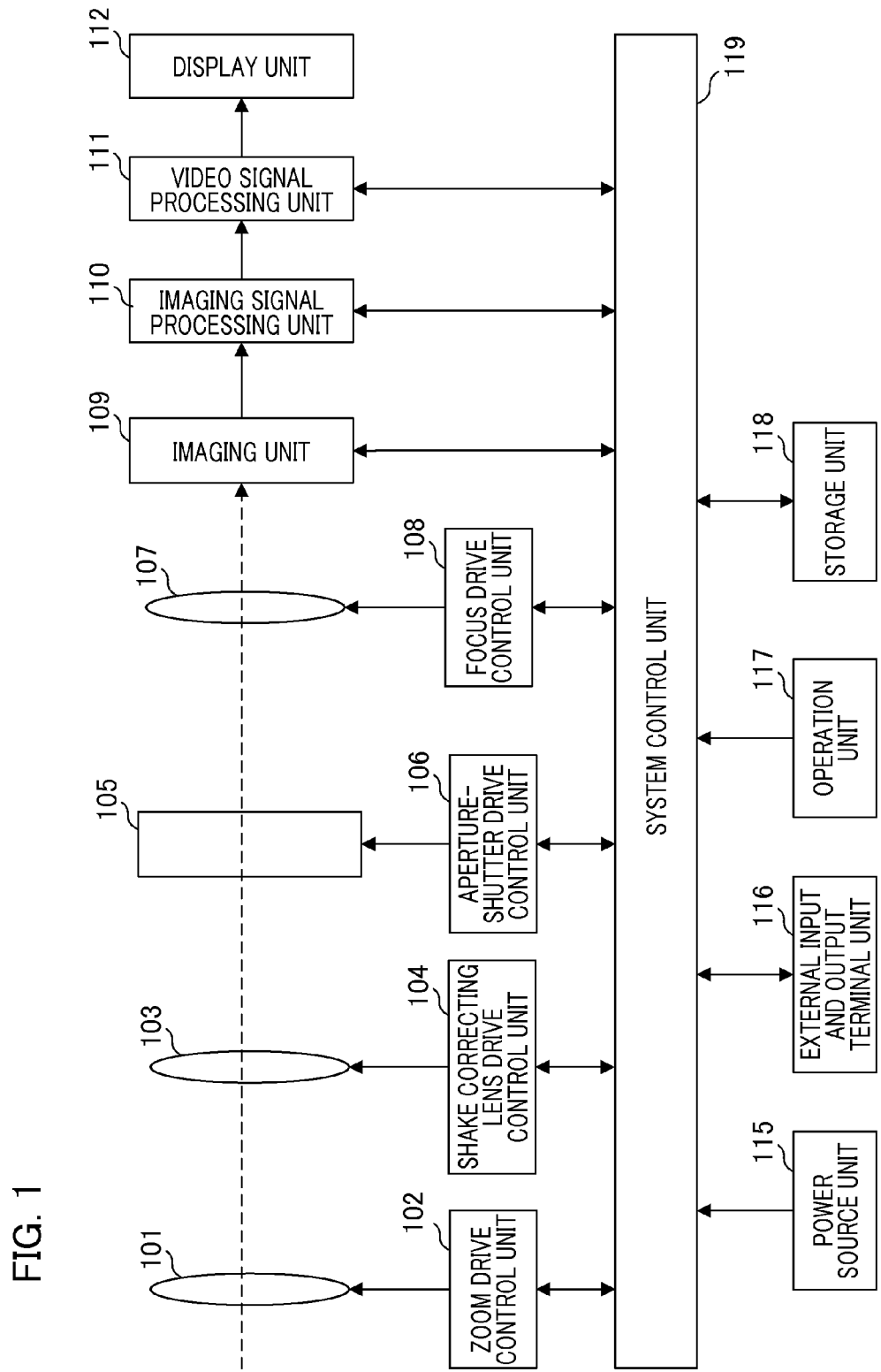
FIG. 1 is a block diagram illustrating an example of a functional configuration of an image pickup apparatus to illustrate an embodiment of the present invention in conjunction with FIG. 2A-FIG. 11.

FIG. 1 is a block diagram illustrating an example of a functional configuration of an image pickup apparatus according to an embodiment of the present invention. Although a digital still camera is illustrated as the image pickup apparatus according to this embodiment, a camera with a function of moving image photographing may be used. A zoom unit 101 that constitutes a photographing optical system (focusing optical system) is a portion of a photographing lens device with variable magnification and comprises a zoom lens for changing the photographing magnification lens device. A zoom drive control unit 102 controls a drive of the zoom unit 101 according to the instructions of the control of a system control unit 119. A shake correcting lens (hereinafter referred to as a "correcting lens") 103 is an optical member that constitutes a portion of the photographing optical system serving as an image shake correcting member. The correcting lens 103 is a shift lens capable of moving in a direction different from the optical axis of the photographing optical system, for example, a direction perpendicular to the optical axis. A shake correcting lens drive control unit 104 drives the correcting lens 103 according to the instructions of the control of the system control unit 119.

An aperture-shutter unit 105 comprises a mechanical shutter with an aperture function. An aperture-shutter drive control unit 106 drives the aperture-shutter unit 105 according to the instructions for the control of the system control unit 119. A focus unit 107 is a portion of the photographing lens and comprises a focus lens capable of changing its position along the optical axis of the photographing lens. A focus drive control unit 108 drives the focus unit 107 according to the instructions for the control of the system control unit 119 to perform a focus-adjustment operation.

An imaging unit 109 comprises an imaging element such as a CCD (charge coupled device) image sensor and a CMOS (complementary metal oxide semiconductor) image sensor. The imaging element photoelectrically converts an optical image formed by the photographing optical system into an electric signal in pixel units. An imaging signal processing unit 110 performs A (analog)/D (digital) conversion, correlating double sampling, gamma correction, white balance correction, color interpolation processing and the like against the electric signal output by the imaging unit 109 to convert the electric signal output by the imaging unit 109 into a video signal. A video signal processing unit 111 processes the video signal output from the imaging signal processing unit 110 depending on the use. More specifically, the video signal processing unit 111 generates a video signal for display and performs an encoding process and a data filing for recording.

A display unit 112 displays the image as necessary based on the video signal for display which the video signal processing unit 111 outputs. A power source unit 115 supplies the power source to the whole image pickup apparatus depending on the use. An external input and output terminal unit 116 is used to input and output a communication signal and the video signal between the external input and output terminal unit 116 and an external device. An operation unit 117 is used when the user operates the image pickup apparatus, and comprises a button, a switch or the like to provide instructions to the image pickup apparatus. A storage unit 118 stores a variety of data such as video information. The system control unit 119 for controlling a camera system comprises a CPU (Central Processing Unit), a ROM (Read Only Memory), a RAM (Random Access Memory), and the like. The control unit 119 develops the control program stored in the ROM to the RAM to carry out the instruction in the CPU. Thereby, each unit of the image pickup apparatus can be controlled to realize a variety of operations, as described below.

The operation unit 117 comprises a release switch configured to turn "ON" a first switch (referred to a SW1) and a second switch (referred to a SW2) in turn depending on the pressing amount of a release button. The SW1 turns "ON" when the release button is half-pressed, and the SW2 turns "ON" when the release button is fully-pressed. When the SW1 turns "ON", the system control unit 119 controls the focus drive control unit 108 to adjust the focus based on an AF (auto focus) evaluation value. The AF evaluation value is, for example, generated based on the video signal for display output to the display unit 112 by the video signal processing unit 111.

The system control unit 119 obtains information about brightness of the video signal and performs AE (automatic exposure) processing, for example, determining an aperture value and a shutter speed to obtain an appropriate exposure amount based on a predetermined program diagram. When the SW2 is turned "ON", the system control unit 119 performs photographing at the determined aperture and shutter speed, and controls the image data obtained by the imaging unit 109, and stores the data to the storage unit 118 and the like.

The operation unit 117 comprises an image shake correction switch for selecting an image shake correction mode. If the image shake correction mode is selected by the operation of the image shake correction switch, the system control unit 119 instructs the shake correcting lens drive control unit 104 to operate the shake correction. The shake correcting lens drive control unit 104 that has been instructed continues the operation of the shake correction until the "the image shake correction-OFF" instruction is issued. Also, the operation unit 117 comprises a mode select switch for selecting a still image photographing mode, a moving image photographing mode or the like. The operation unit 117 can change the operation conditions of the shake correcting lens drive control unit 104 in each of the selected photographing modes. The operation unit 117 also comprises a play-mode select switch for selecting a play-mode and stops the operation of the shake correction during the play-mode. The operation unit 117 comprises a magnification change switch for performing the instruction for changing the zoom magnification. When the instruction for changing the zoom magnification is performed by the operation of the magnification change switch, the zoom drive control unit 102 that has received the instruction via the system control unit 119 drives the zoom unit 101 to move the zoom lens to the instructed position to vary the magnification.

Figure 2A:
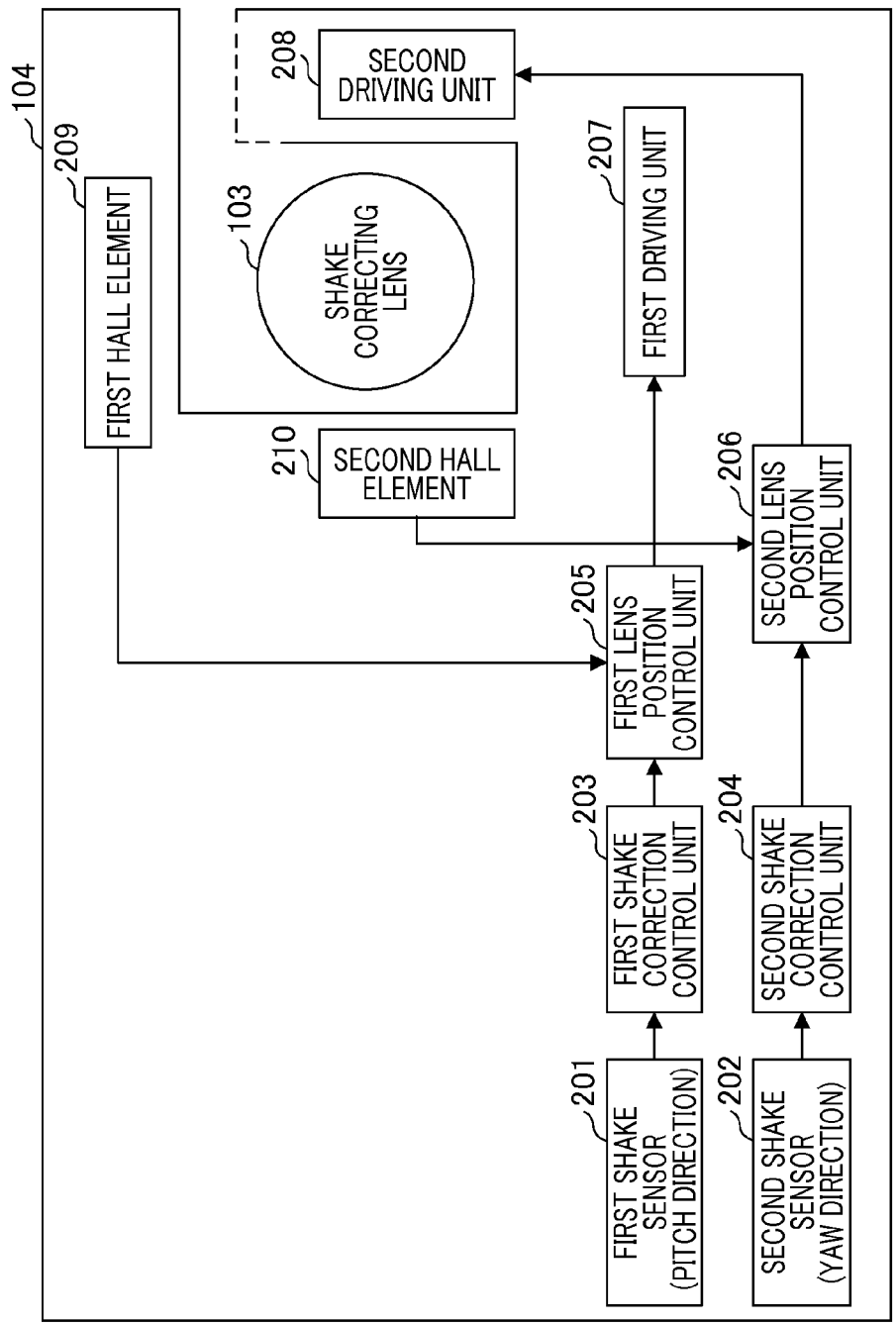
FIG. 2A is a block diagram illustrating an exemplary configuration of a shake correcting lens drive unit.

Next, a description will be given of a configuration of the shake correcting lens drive control unit 104 referred to FIG. 2A. FIG. 2A is a block diagram illustrating an example of a functional configuration of the shake correcting lens drive control unit 104. A shake detection unit comprises a first shake sensor 201 and a second shake sensor 202 to detect each shake in a plurality of directions.

The first shake sensor 201 is, for example, an angular velocity sensor, and detects a shake in a direction perpendicular to the image pickup apparatus (pitch direction) in a natural attitude (a reference attitude whose longitudinal direction of the image closely matches to the horizontal direction). The first shake sensor 201 outputs a shake detection signal to a first shake correction control unit 203. The second shake sensor 202 is, for example, an angular velocity sensor and detects a shake in a direction parallel to the image pickup apparatus (yaw direction) in a natural attitude. The second shake sensor 202 outputs the shake detection signal to a second shake correction control unit 204.

The first and second shake correction control units 203 and 204 determine target positions of the correcting lens 103 in the pitch direction and the yaw direction relative to output correction position control signals regarding the target position to control a drive of the correcting lens 103. The first shake correction control unit 203 outputs the correction position control signal to a first lens position control unit 205, and the second shake correction control unit 204 outputs the correction position control signal to a second lens position control unit 206.

The first lens position control unit 205 performs a drive-control of a first driving unit 207 comprising, for example, an actuator, by feedback control. This feedback control is carried out based on the correction position control signal in the pitch direction from the first shake correction control unit 203 and a position detection signal described as below. Also, the second lens position control unit 206 performs drive-control of a second driving unit 208 comprising the actuator by a feedback control. This feedback control is carried out based on the correction position control signal in the yaw direction from the second shake correction control unit 204 and the position detection signal, as described below.

A position detection unit of the correcting lens 103 comprises a first Hall element 209 and a second Hall element 210 to obtain position information corresponding to the two directions. The first Hall element 209 detects the position of the correcting lens 103 in the pitch direction to output the detected position information to the first lens position control unit 205. Also, the second Hall element 210 detects the position of the correcting lens 103 in the yaw direction to output the detected position information to the second lens position control unit 206.

Next, a description will be given of the drive control of the correcting lens 103 performed by the shake correcting lens drive control unit 104. The first and second shake correction control units 203 and 204 obtain the shake detection signals (angular velocity signals) representing the shaking of the image pickup apparatus in the pitch direction and the yaw direction respectively. The first and second shake correction control units 203 and 204 generate the correction position control signals for driving the correcting lens 103 in the pitch direction and the yaw direction based on the shake detection signals and outputs those signals to the first and second lens position control units 205 and 206, respectively.

The first Hall element 209 and the second Hall element 210 output voltage signals depending on the magnetic field strength produced by magnets provided in a unit comprising the correcting lens 103 as the position information of the correcting lens 103 in the pitch direction and the yaw direction. Each type of the position information is output to the first and the second lens position control units 205 and 206, respectively. The first and the second lens position control units 205 and 206 perform the drive-control of the first driving unit 207 and the second driving unit 208, respectively. In other words, each signal value of the first Hall element 209 and the second Hall element 210 represents the position of the correcting lens 103. The feedback control can be realized such that each signal value is caused to converge to a correction position control signal value (representing the target position of the correcting lens 103) from the first and the second shake correction control units 203 and 204, respectively. Note that the position signal values output from the first Hall element 209 and the second Hall element 210 are variable. Therefore, the outputs of the first Hall element 209 and the second Hall element 210 are adjusted such that the correcting lens 103 moves to the predetermined position with respect to the correction position control signals.

The first and second shake correction control units 203 and 204 respectively output the correction position control signals for moving the position of the correcting lens 103 to cancel the image shake based on the shake detection information from the first and second shake sensors 201 and 202. For example, the first and second shake correction control units 203 and 204 generate the control signals of the speed or the position of the correction based on the angular velocity signal having the shake detection information or the signal for performing the filter processing to the angular velocity signal.

By the above operation, even if a vibration such as hand shaking is applied to the image pickup apparatus during photographing, the image shake correction can be performed to a certain level of vibration. Also, the first and second shake correction control units 203 and 204 detect a shake state of the image pickup apparatus based on the detection information of the first and second shake sensors 201 and 202, and the outputs of the first and second Hall elements 209 and 210 to perform a control of a panning (or a tilting).

Figure 3:
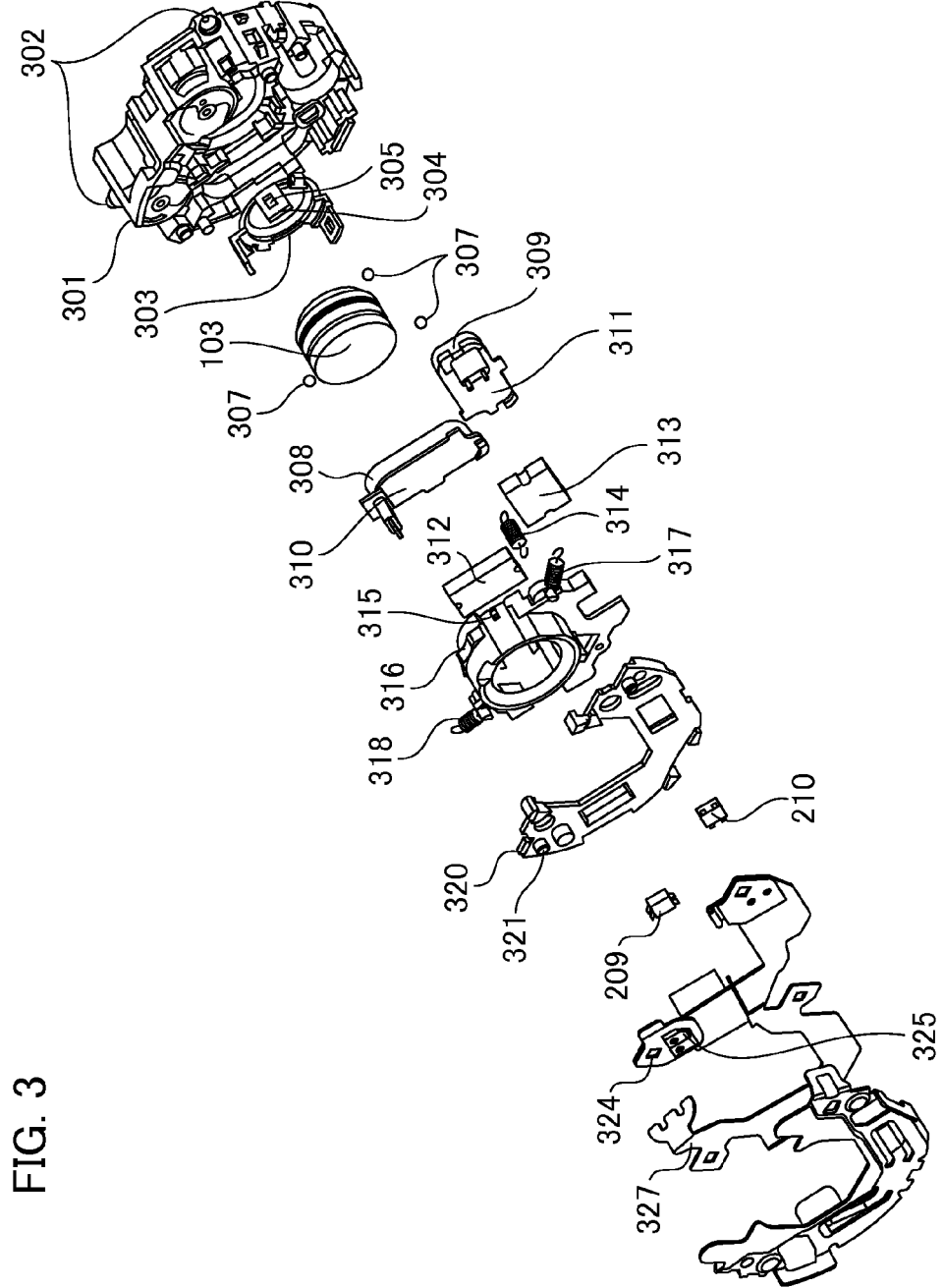
FIG. 3 is an exploded perspective view illustrating an exemplary configuration of a shake correcting mechanism unit.

Next, a description will be given of the shake correcting mechanism unit referred to FIG. 3. FIG. 3 is an exploded perspective view illustrating an exemplary configuration of the concrete shake correcting mechanism unit. The shake correcting mechanism unit comprises a correcting lens 103, a shake correcting lens drive control unit 104, an aperture-shutter unit 105, and an aperture-shutter drive control unit 106.

A base 301 is a base of the shake correcting mechanism unit and fixed to the aperture-shutter unit 105 and a ND (Neutral Density) filter mechanism. The base 301 is provided together with two follower pins 302 and a movable follower pin (not shown). Three cam grooves in a cam cylinder (not shown) disposed outward in a radial direction of the base 301 are configured to match with these three follower pins, and move the pins backward and forward in the direction of the optical axis along the cam grooves.

The correcting lens 103 is held in a holder 316 by a caulking pawl (not shown). A lens cover 303 comprises an opening for limiting the light flux passed through the correcting lens 103. The lens cover 303 comprises three arm units 304 at the side thereof. The arm units 304 comprise openings 305 and fit on the three projections 315 provided at the side of the holder 316 to hold the lens cover 303 to the holder 316 integrally. The holder 316 integrally holds magnets 312 and 313. The holder 316 is pressure welded to the base 301 through three balls 307 and is rolling supported by the balls 307 to allow the holder to be movable in any direction in a plane perpendicular to the optical axis. The configuration for holding the holder 316 via the balls 307 can realize a more rapid movement with less amplitude than a configuration for guiding the holder by a guide bar. Therefore, this invention can provide an excellent image shake correction even if the image pickup apparatus has an imaging element with a large number of pixels.

One end of a thrust spring 314 is engaged with the projection 315 of the holder 316 and the other end thereof is engaged with a projection (not shown) provided in the base 301. The thrust spring 314 is held at the extended state and urges the holder 316 toward the base 301. Radial springs 317 and 318 have a role of preventing rotation of the holder 316. Bobbins 317 and 318 made of resins are configured together with pins made of metals and are attached to the end of coils 308 and 309. A land of a flexible printed circuit (FPC) 324 is electrically connected to the pins of the bobbins 310 and 311 by soldering or the like to form an electric power supplied circuit to coils 308 and 309.

A first Hall element 209 and a second Hall element 210 are provided close to the magnets 312 and 313 and detect the magnetic fields by the magnets 312 and 313 respectively. The first Hall element 209 and the second Hall element 210 are mounted to the FPC 324 to supply the electric power therethrough. A FPC 327 forms a circuit that supplies the electric power to the aperture-shutter unit 105 and the ND filer drive unit. The FPC 324 and 327 are fixed to the holder 320 by a projection 321.

Figure 2B:
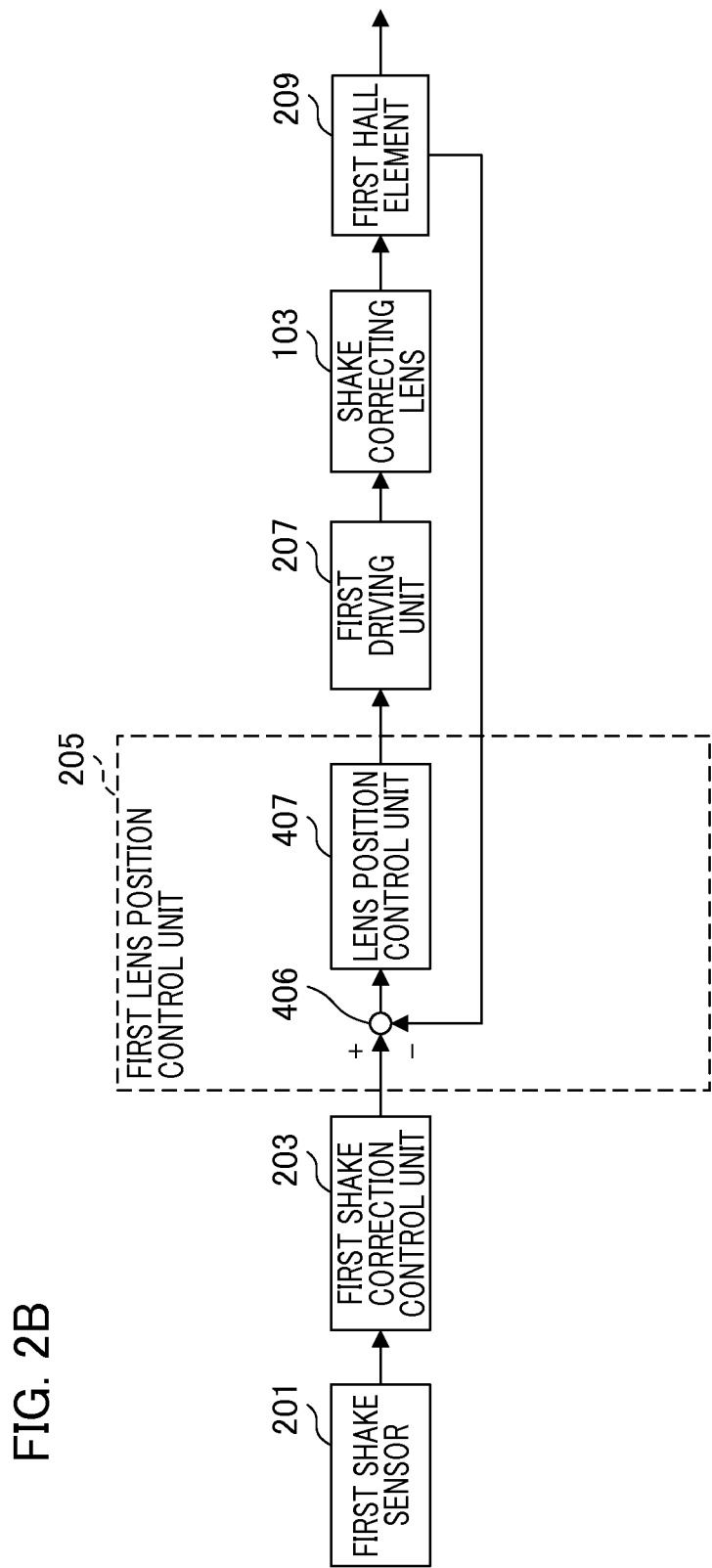
FIG. 2B is a block diagram illustrating exemplary configurations inside of a shake correction control unit and a lens position control unit.

Next, referring to FIG. 2B and FIG. 4, a description will be given of configurations of the interior of the first shake correction control unit 203 and the first lens position control unit 205. Note that the second shake correction control unit 204 and the second lens position control unit 206 have configurations similar to those and thus, a description thereof will be omitted. In FIG. 2B, the first shake sensor 201 serving as the shake detecting unit detects a shake applied to the image pickup apparatus and outputs a shake signal (angular velocity signal) depending on the shake. The shake signal is processed in the first shake correction control unit 203 to output the signal to a subtracting unit 406. The configuration of the first shake correction control unit 203 is described as below by using FIG. 4.

The subtracting unit 406 subtracts a position detection signal generated by the first Hall element 209 from the signal generated by the first shake correction control unit 203 to output a signal of the target position of the correcting lens to a lens position control unit 407. The lens position control unit 407 comprises a control arithmetic device and performs, for example, calculations of a P (proportion) control, an I (integration) control, and a D (differentiation) control by a PID controller. The lens position control unit 407 outputs a drive signal of the correcting lens 103 to the first driving unit 207. The image shake correction is carried out by the feedback control of the position information detected by the first Hall element 209 on the target position of the correcting lens.

Figure 4:
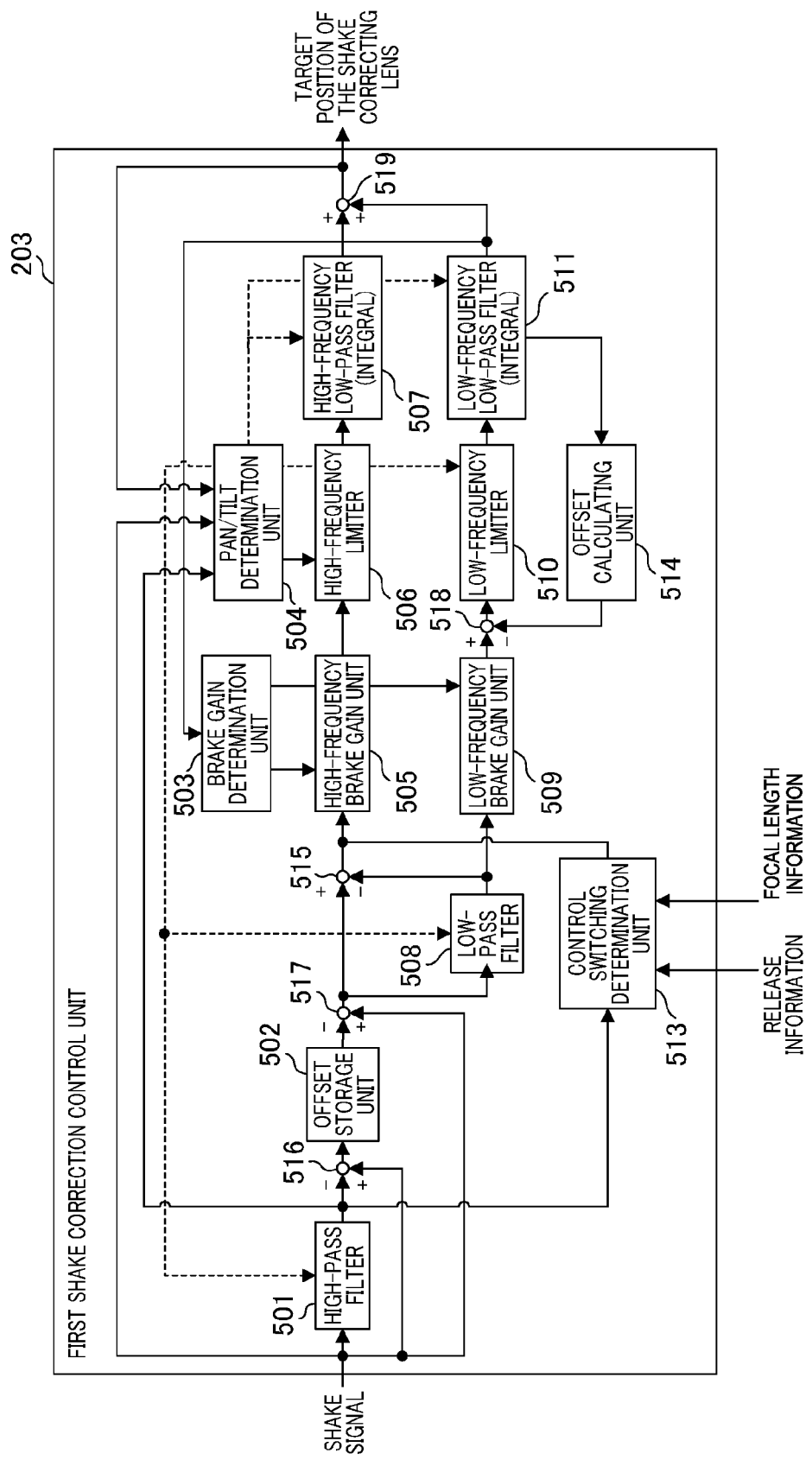
FIG. 4 is a block diagram illustrating an exemplary configuration inside of a shake correction control unit.

FIG. 4 is a block diagram illustrating an exemplary configuration of the first shake correction control unit 203. A high-pass filter (hereinafter referred to as an "HPF") 501 is a digital filter for removing offset components of relatively low-frequencies from the shake signal output from the first shake sensor 201 and can change cut-off frequency thereof. The shake signal from which the offset components have been removed by the HPF 501 is subtracted from the shake signal before removing the offset components to extract the offset components of the shake signal in a subtracting unit 516. The extracted offset components of the shake signal are held in an offset storage unit 502. In a subtracting unit 517, the output of the offset storage unit 502 is subtracted from the shake signal output from the first shake sensor 201 to calculate the shake signal from which the offset components have been removed. In an embodiment of the present invention, an input to the offset storage unit 502 is calculated beforehand, and then the update of the offset value held in the offset storage unit 502 is stopped while starting the control. This processing is carried out while proceeding from a first control mode to a second control mode described as below. Hereinafter, the second control mode removes the fixed offset value from the shake signal without the HPF 501. The shake signal removing the offset value is output to a subtracting unit 515 and a low-pass filter (hereinafter referred to as a "LPF") 508.

The shake signal removing the offset value is processed by the LPF 508 to extract the low-frequency components. The LPF 508 is a filter with a variable converging time constant of the filter calculation and extracts low-frequency components of the shake signal. Then, the subtracting unit 515 can subtract the low-frequency components of the shake signal extracted by the LPF 508 from the shake signal after removing the offset to obtain high-frequency components of the shake signal. In other words, the present embodiment comprises a dividing unit configured to divide the shake signal into a plurality of frequency components (low-frequency components and high-frequency components in this embodiment). The shake signal of the low-frequency components (hereinafter referred to as a "low-frequency shake signal") is output from the LPF 508 to a low-frequency brake gain unit 509. The shake signal of the high-frequency components (hereinafter referred to as a "high-frequency shake signal") is output from the subtracting unit 515 to a high-frequency brake gain unit 505. The high-frequency brake gain unit 505 multiplies a gain determined by a brake gain determination unit 503 and the high-frequency shake signal. The high-frequency shake signal after multiplying the brake gain is limited by a high-frequency limiter 506. In other words, the signal level is limited to prevent the input of a large shake signal greater than or equal to a predetermined value to a high-frequency LPF 507. The output of the high-frequency limiter 506 is integrated with the high-frequency LPF 507 capable of changing the cut-off frequency. The high-frequency LPF 507 for integrating the high-frequency shake signal (a first low-pass filter) has a variable converging time constant of the filter calculation. This integration process converts angular velocity information into angular information to generate a shake angle signal in which only the high-frequency components have been extracted.

In contrast, the low-frequency brake gain unit 509 multiplies the gain determined by the brake gain determination unit 503 and the low-frequency shake signal extracted by the LPF 508 (third low-pass filter) together. And then, the subtracting unit 518 subtracts the offset value calculated by an offset calculating unit 514 from the output of the low-frequency brake gain unit 509. The low-frequency shake signal after subtracting the offset is limited by a low-frequency limiter 510, and further integrated with a low-frequency LPF 511 (second low-pass filter). The low-frequency LPF 511 has a variable cut-off frequency and generates a shake angle signal from which only the low-frequency components have been extracted. The low-frequency LPF 511 for integrating the low-frequency components has a converging time constant of the filter calculation that is variable. The offset calculating unit 514 calculates the offset value from the output of the low-frequency LPF 511. If the stationary offset components in the state that does not generate the shake are applied to the low-frequency shake signal multiplying the brake gain after dividing the frequency, the offset components are calculated such that the offset value is subtracted so as to be 0 at an input end of the low-frequency limiter 510. The above processing can prevent the correcting lens 103 from being driven out of the range in which the correcting lens can be controlled due to the monotonic increase of the low-frequency shake angle signal integrated by the low-frequency LPF 511. Each output of the high-frequency LPF 507 and the low-frequency LPF 511 is added in an adding unit 519 to output the result as a target position of the correcting lens.

A pan/tilt determination unit 504 obtains the shake signal, the output of the HPF 501, and the output of the adding unit 519 to determine whether the image pickup apparatus is panning or the tilting. The pan/tilt determination unit 504 determines that it is in a panning operation or a tilting operation in the following cases:

1) if the image pickup apparatus has the shake signal or the shake signal after removing the offset by the HPF 501 more that is than a predetermined determination reference value (threshold value) when a large shake is applied to the apparatus; and 2) if the position of the correcting lens 103 is more spaced apart from a center position of the movable range relative to or equal to a predetermined value.

At this case, the HPF 501, the LPF 508, the high-frequency LPF 507, and the low-frequency LPF 511 set the cut-off frequency to be high values with respect to the result of the determination of the pan/tilt determination unit 504. Alternatively, the pan/tilt determination unit 504 performs processing for changing an intermediate value so as not to increase the intermediate value that is the stored value of the calculation inside of the digital filter in place of changing the cut-off frequency. The high-frequency limiter 506 and the low-frequency limiter 510 carry out the processing of the calculation for limiting the input to the corresponding filters respectively within the predetermined value.

The brake gain determination unit 503 can set the gains less than 1 time thereof to the high-frequency brake gain unit 505 and the low-frequency brake gain unit 509 when the target value of the collecting lens 103 at the low-frequency calculated by the low-frequency LPF 511 is greater than or equal to the predetermined threshold value in order to prevent the correcting lens 103 from being driven out of the drivable range. This processing can also prevent the correcting lens from being driven out of the movable range if the large shake is applied to the image pickup apparatus and prevent a photographing image from being unstable due to the swing-back immediately after the panning operation.

The shake angle signals for the low-frequency and the high-frequency of the shake signal as generated above are combined in the adding unit 519 and the result is output as a target position for the correcting lens to the lens position control unit 407. The lens position control unit 407 performs the control of the shake correction by feedback control based on the target position of the correcting lens and position information detected by the Hall element 209.

A control switching determination unit 513 obtains the shake signal after the processing by the HPF 501, the high-frequency shake signal extracted by the LPF 508 and the subtracting unit 515, release information that the photographer sets by the operation unit 117, and information about the photographing magnification (focal length) and the like. The control switching determination unit 513 selects a first control method or a second control method depending on these signals and the information. The first control method is a control method for performing an image shake correction by using a signal that is generated by dividing the detection signal processed by the HPF 501 into frequency in a first control mode. Also, the second control method is a control method for performing an image shake correction by using a signal that is generated by dividing the detection signal not processed by the HPF 501 into the frequency in a second control mode. Note that detailed descriptions of the first control method and the second control method are described below by using FIG. 5 to FIG. 7.

Figure 10:
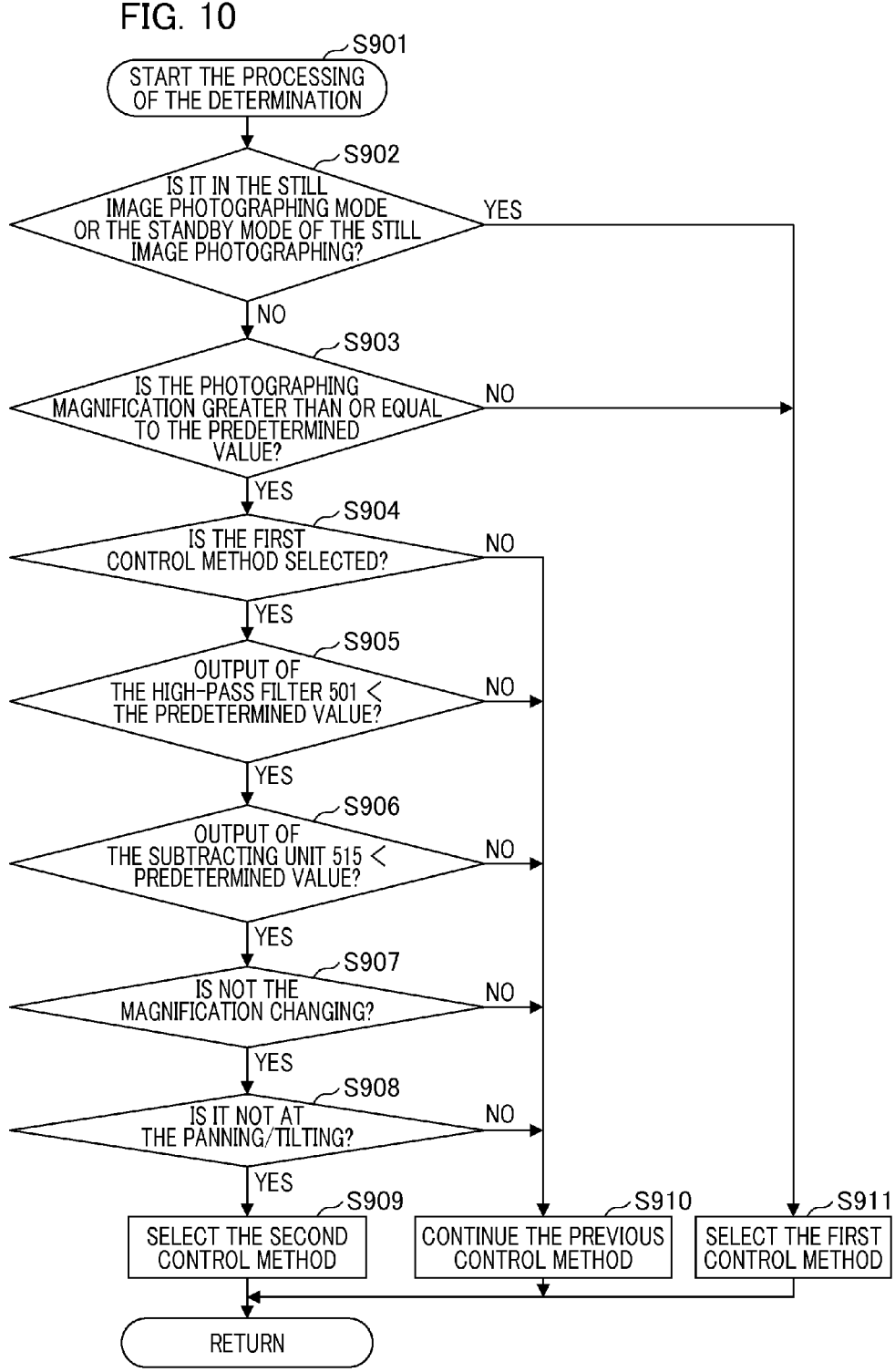
FIG. 10 is a flow chart illustrating processing of a control switching determination unit.

Referring to a flow chart shown in FIG. 10, a description will be given of a determining condition and determining processing when the first control method or the second control method is selected. The control switching determination unit 513 performs processing for determining the switching between the first control mode and the second control mode at a constant period based on the photographing condition and the shake state of the image pickup apparatus. When the determining processing is started (S901), the operation unit 117 obtains a photographing mode set by the photographer and determines the mode (S902). As the result of the determination of the mode, if the mode is at a still image photographing mode or a standby state of the still image photographing mode, the processing proceeds to S911 and the first control method is selected. In contrast, if the mode is not determined to be at the still image photographing mode or the standby state of the still image photographing mode, the processing proceeds to S903 to determine whether the photographing magnification is greater than or equal to a predetermined threshold value or not. In S903, if the photographing magnification is less than the predetermined threshold value, the processing proceeds to S911 and the first control method is selected. If the photographing magnification is greater than or equal to the threshold value, the processing proceeds to S904.

In S904, it is determined whether the first control method is selected in the processing at a previous cycle of the determination. If the first control method is selected, the processing proceeds to S905, and if the first control method is not selected, the processing proceeds to S910 and continues the control method selected previously. In S905, it is determined whether the output of the HPF 501 is less than the predetermined value or not. If the output of the HPF 501 is less than the predetermined value, the processing proceeds to S906, and if the output is greater than or equal to the predetermined value, the processing proceeds to S910.

In S906, it is determined whether the output of the subtracting unit 515 is less than the predetermined value or not. If the output is less than the predetermined value, the processing proceeds to S907 and if the output is greater than or equal to the predetermined value, the processing proceeds to S910. In S907, it is determined whether the image pickup apparatus is in a state of changing the magnification by a zoom-drive or not. If it is not in the state of changing the magnification, the processing proceeds to S908, and if it is in the state of changing the magnification, the processing proceeds to S910. In S908, the pan/tilt determination unit 504 determines whether the image pickup apparatus is in the panning operation or the tilting operation (hereinafter, referred to as a "panning/tilting") or not. If the image pickup apparatus is not panning/tilting, the processing proceeds to S909 and if it is panning/tilting, the processing proceeds to S910. In S909, the second control method is selected.

If some affirmative results in the determinations are concluded in the determinations from S904 to S908, the second control method is selected. If at least one negative result of the determination is concluded in the determinations, the control method selected by the processing at the previous cycle of the determination is continued. In the following, a description will be given of the reasons why the determining condition according to the photographing condition and the shake state of the image pickup apparatus is used to select each control method.

Firstly, the photographing of a still image has a shorter exposure time and less influence on the swing-back in comparison to the photographing the moving image. Also, the standby state of the photographing the still image will have a large swing if the photographer does not steadily hold the image pickup apparatus since such a standby state is not photographing. Thereby, the first control method for removing swing-components at the low-pass is selected. Also, the first control method is selected since an area with a small photographing magnification has a more inconspicuous swing-back compared to that with a large photographing magnification and is likely to cause the large swing by some cases such as the photographing while walking. If the output of the HPF 501, the output of the subtracting unit 515, or both, is less than the predetermined value, there is no vibration due to the change of the magnification, or the large shake due to the pan operation or the like does not occur, the control method selected by the processing at the previous cycle of the determination continues not storing the wrong offset to the offset value held in the offset storage unit 502 used in the second control method. When any one of the processes from S909 to S911 is stopped, the process is returned to the start.

Figure 5:
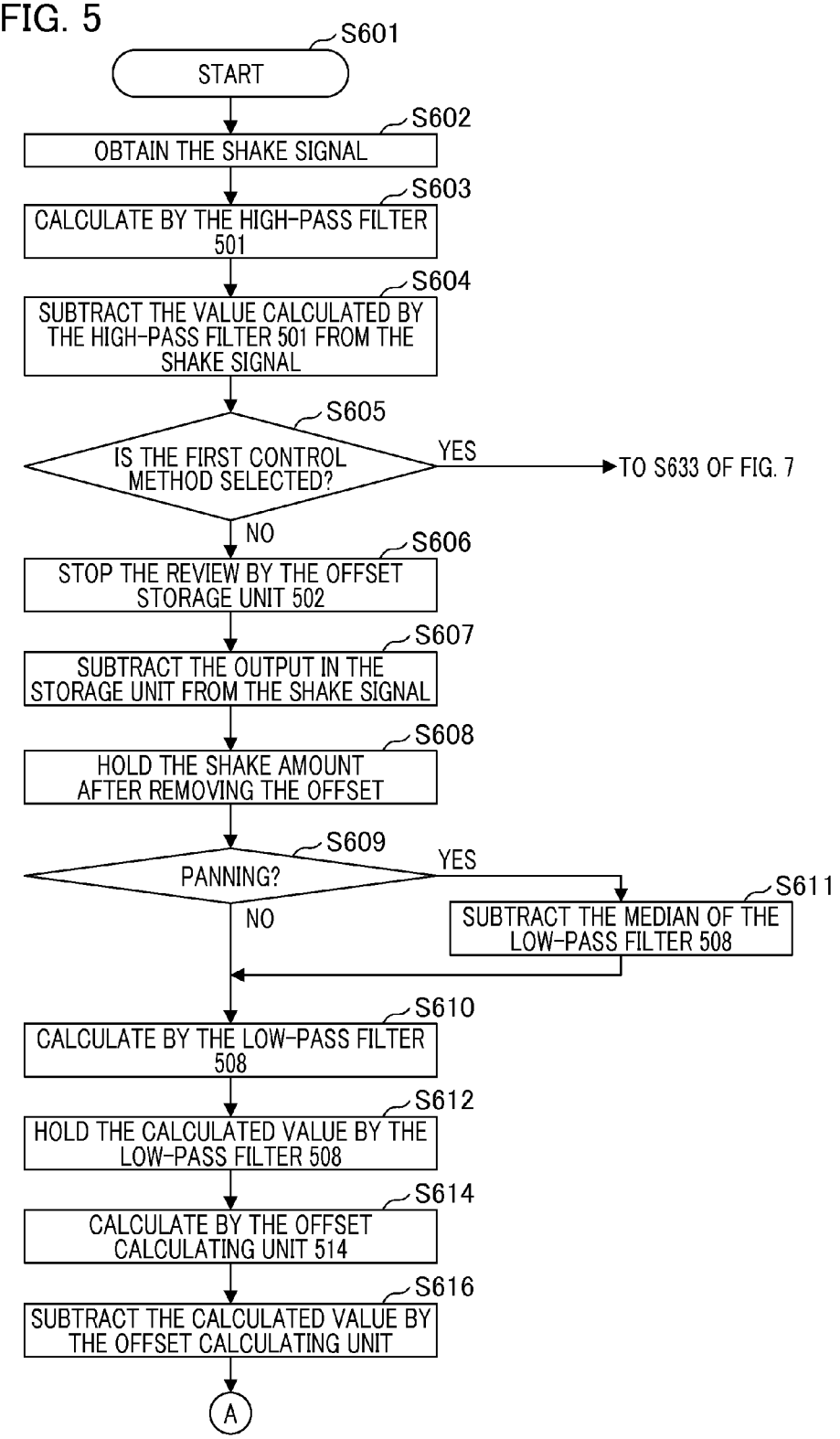
FIG. 5 is a flow chart illustrating processing of a shake correction control unit.
Figure 6:
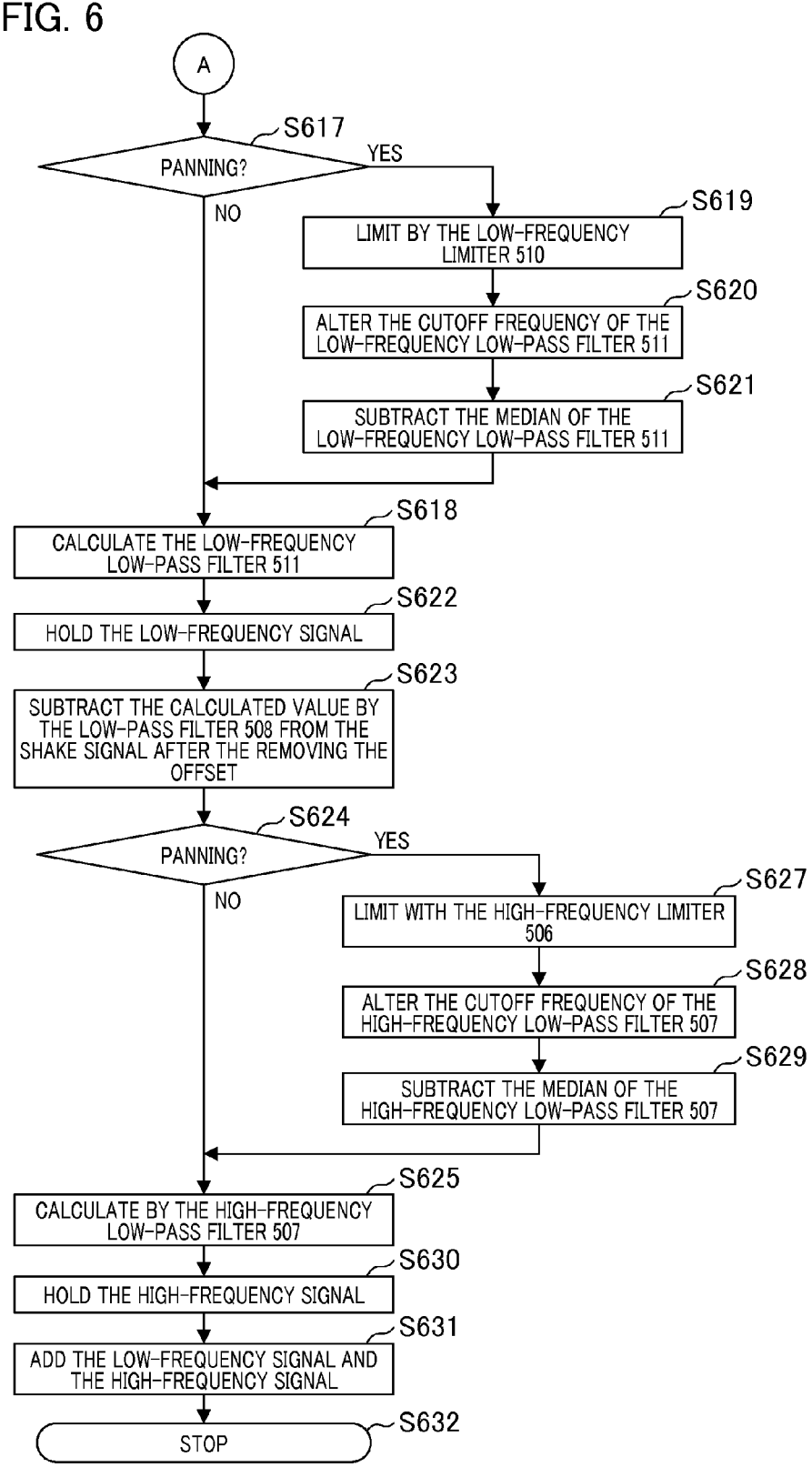
FIG. 6 is a flow chart illustrating processing of a shake correction control unit continued from FIG. 5.

Next, a description will be given of processing in the first control method and the second control method referring to the flowcharts from FIG. 5 to FIG. 7A calculation for the control of the shake correction is carried out at a constant period. FIG. 5 and FIG. 6 are a flow charts illustrating a series of processes in the second control method (during the second control mode). When the selection of the first control method is determined in the determining step of S605, the processing proceeds to processing in the first control method illustrated in the flow chart of FIG. 7 (at the first control mode).

When the processing is started in S601 of FIG. 5, the HPF 501 obtains a shake signal from the first shake sensor 201 (S602) and removes low-pass components by the calculation (S603). And then, the subtracting unit 516 subtracts the shake signal removing the low-pass from the shake signal (S604) to calculate the low-pass offset included in the shake signal. In next S605, the control switching determination unit 513 determines whether the first control method is selected or not (referred to as FIG. 10). If the first control method is selected as the result of the determination, the processing proceeds to S633 in FIG. 7.

Figure 7:
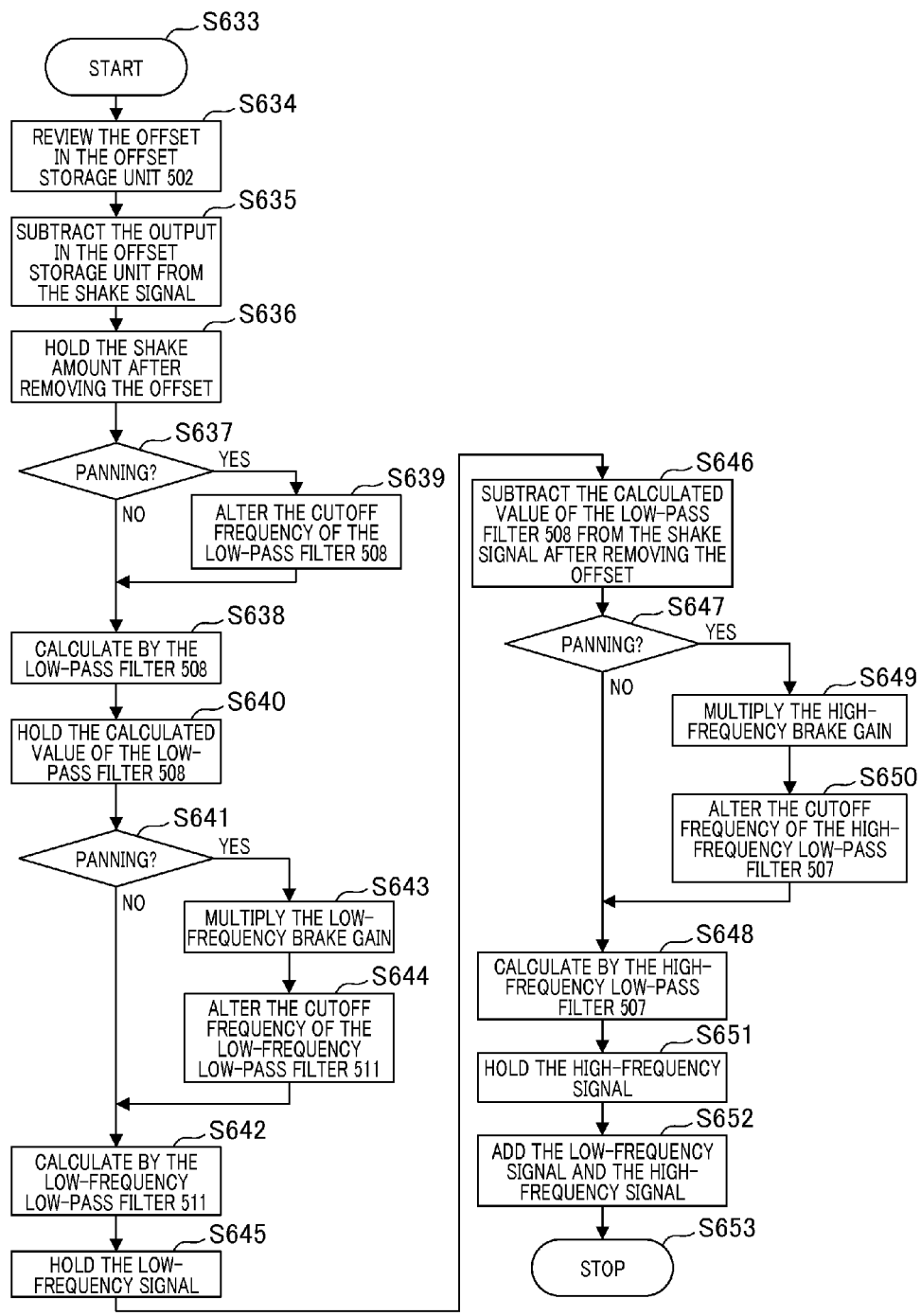
FIG. 7 is a flow chart illustrating processing by a first control method continued from FIG. 5.

In the first control method shown in FIG. 7, the offset storage unit 502 holds the low-pass offset of the shake signal calculated in S604 to updating thereof. Next, the subtracting unit 517 subtracts the offset value stored in the offset storage unit 502 from the shake signal (s635) and holds the result of the subtraction (S636). Next, the pan/tilt determination unit 504 determines whether the image pickup apparatus is panning/tilting or not (S637). If it is panning/tilting, the processing proceeds to S639, and if it is not panning/tilting, it goes to S638. In S639, the pan/tilt determination unit 504 advances the processing to S638 after setting the cut-off frequency to the high-frequency side.

In S638, the LPF 508 performs the calculation and extracts low-frequency components of the shake amount by holding the calculated value (S640). Next, the pan/tilt determination unit 504 determines again whether the image pickup apparatus is panning/tilting (S641). If the image pickup apparatus is panning/tilting, the processing proceeds to S643, and if it is not panning/tilting, the processing proceeds to S642. In S643, the brake gain determination unit 503 performs a multiplying processing of the low-frequency brake gain less than 1 time thereof based on the distance between the target position and a drive-center position of the correcting lens 103 so as not to cause the correcting lens 103 to be out of the drive range. In addition, the pan/tilt determination unit 504 performs the processing for changing the cut-off frequency of the low-frequency LPF 511 to the side of the high-frequency in S644 to proceed the processing to S642.

In S642, the low-frequency LPF 511 performs the calculation and holds the result of the calculation (S645) to calculate a target position of the correcting lens with respect to the shake amount for the low-frequency. In the next S646, the subtracting unit 515 subtracts the calculated value of the LPF 508 from the shake amount after removing the offsets held in S636 and S640 to extract high-frequency components of the shake amount. In S647, the pan/tilt determination unit 504 determines whether the image pickup apparatus is panning/tilting or not. If the image pickup apparatus is panning/tilting, the processing proceeds to S649, and if it is not panning/tilting, the processing proceeds to S648. In S649, a multiplying processing of the high-frequency brake gain less than 1 time thereof is carried out based on the distance between the target position and the drive-center position of the correcting lens 103 so as not to cause the correcting lens 103 to be out of the drive range. The pan/tilt determination unit 504 changes the cut-off frequency of the high-frequency LPF 507 to the high-frequency side (S650).

In S648, the high-frequency LPF 507 performs the calculation and holds the result of the calculation (S651) to calculate a target position of the correcting lens with respect to the shake amount for the high-frequency. In S652, the adding unit 519 adds the target positions of the correcting lens for the low-frequency and the high-frequency held in S645 and S651 to calculate a final target position of the correcting lens to stop the processing in S653.

Next, a description will be given of processing if the second control method is selected in S605 of FIG. 5. In this case, the processing proceeds to S606 and holds the low-pass offset of the shake signal calculated in S604 to stop the update. Thereby, the offset when the first control method shifts to the second control method is held as a fixed value. Next, the subtracting unit 516 subtracts the offset value stored in the offset storage unit 502 from the shake signal (S607) and holds the result of the subtraction (S608). In other words, the second control method stops the offset calculation of the shake signal to use the shake signal in which the low-pass components have not been removed by the HPF 501 in the image shake correction. In this manner, the operation of the swing-back due to the calculation of the digital filter with low cut-off frequency can be suppressed. Next, the pan/tilt determination unit 504 determines whether the image pickup apparatus is panning/tilting or not (S609). If the image pickup apparatus is panning/tilting, the processing proceeds to S611 and if it is not panning/tilting, the processing proceeds to S610. In S611, the pan/tilt determination unit 504 subtracts the predetermined value from the intermediate value of the LPF 508 to suppress the excessive increase for the intermediate value of the filter to the large shake such as the panning operation or the like.

In S610, the LPF 508 performs a calculation and holds the calculated value (S612) to extract the low-frequency components of the shake amount. Next, the offset calculating unit 514 calculates an offset amount so as not to generate the offset at the input end of the low-frequency limiter 510 (S614). The subtracting unit 518 subtracts the offset amount from the low-frequency components of the shake amount (S616). Next, the processing proceeds to S617 in FIG. 6 and the pan/tilt determination unit 504 re-determines whether the image pickup apparatus is panning/tilting or not. If the image pickup apparatus is panning/tilting, the processing proceeds to S619, and if it is not panning/tilting, the processing proceeds to S618. In S619, the low-frequency limiter 510 limits the input to the low-frequency LPF 511 so as not to be greater than or equal to the predetermined value. The pan/tilt determination unit 504 sets the cut-off frequency of the low-frequency LPF 511 to be high based on the distance between the target position and the drive-center position of the correcting lens 103 to prevent the correcting lens 103 from being out of the drive range (S620). In addition, the pan/tilt determination unit 504 subtracts the predetermined value from the intermediate value of the low-frequency LPF 511 to perform a calculation for suppressing the increase of the intermediate value (S621).

In S618, the low-frequency LPF 511 performs a calculation and holds the result of the calculation (S622) to calculate a target position of the correcting lens to the shake amount of the low-frequency. Next, the subtracting unit 515 subtracts the calculated value of the LPF 508 from the shake amount after removing the offsets held in S608 and S612 (S623) to extract the high-frequency components of the shake amount. In S624, the pan/tilt determination unit 504 determines whether the image pickup apparatus is panning/tilting or not. If the image pickup apparatus is panning/tilting, the processing proceeds to S627 and if it is not panning/tilting, the processing proceeds to S625. In S627, the high-frequency limiter 506 limits the input to the high-frequency LPF 507. The pan/tilt determination unit 504 changes the cut-off frequency of the high-frequency LPF 507 to the high-frequency side based on the distance between the target position and the drive-center position of the correcting lens 103 to prevent the correcting lens 103 from being out of the drive range (S628). In addition, the pan/tilt determination unit 504 subtracts the predetermined value from the intermediate value of the high-frequency LPF 507 to perform the calculation for suppressing the increase of the intermediate value (S629).

In S625, the high-frequency LPF 507 performs a calculation and holds the result of the calculation (S630) to calculate a target position of the correcting lens with respect to the shake amount of the high-frequency. The adding unit 519 adds the target positions of the correcting lens for the low-frequency and the high-frequency held in S622 and S630 (S631) to calculate a final target position of the correcting lens and stops the series of the processing in S632.

Feedback control is carried out such that the position of the correcting lens 103 follows the target position calculated in this manner to remove the influence of hand shaking or the like applied to the image pickup apparatus. In this case, the cut-off frequency of the LPF 508 dividing the shake signal into the frequency is determined such that the frequency band with the large influence of the hand shaking or the like is included at the side of the high-frequency. For example, if the shake signal is mainly included in the frequency of approximately 3 Hz to 5 Hz, the cut-off frequency is set to be at least less than or equal to 3 Hz.

Figure 8:
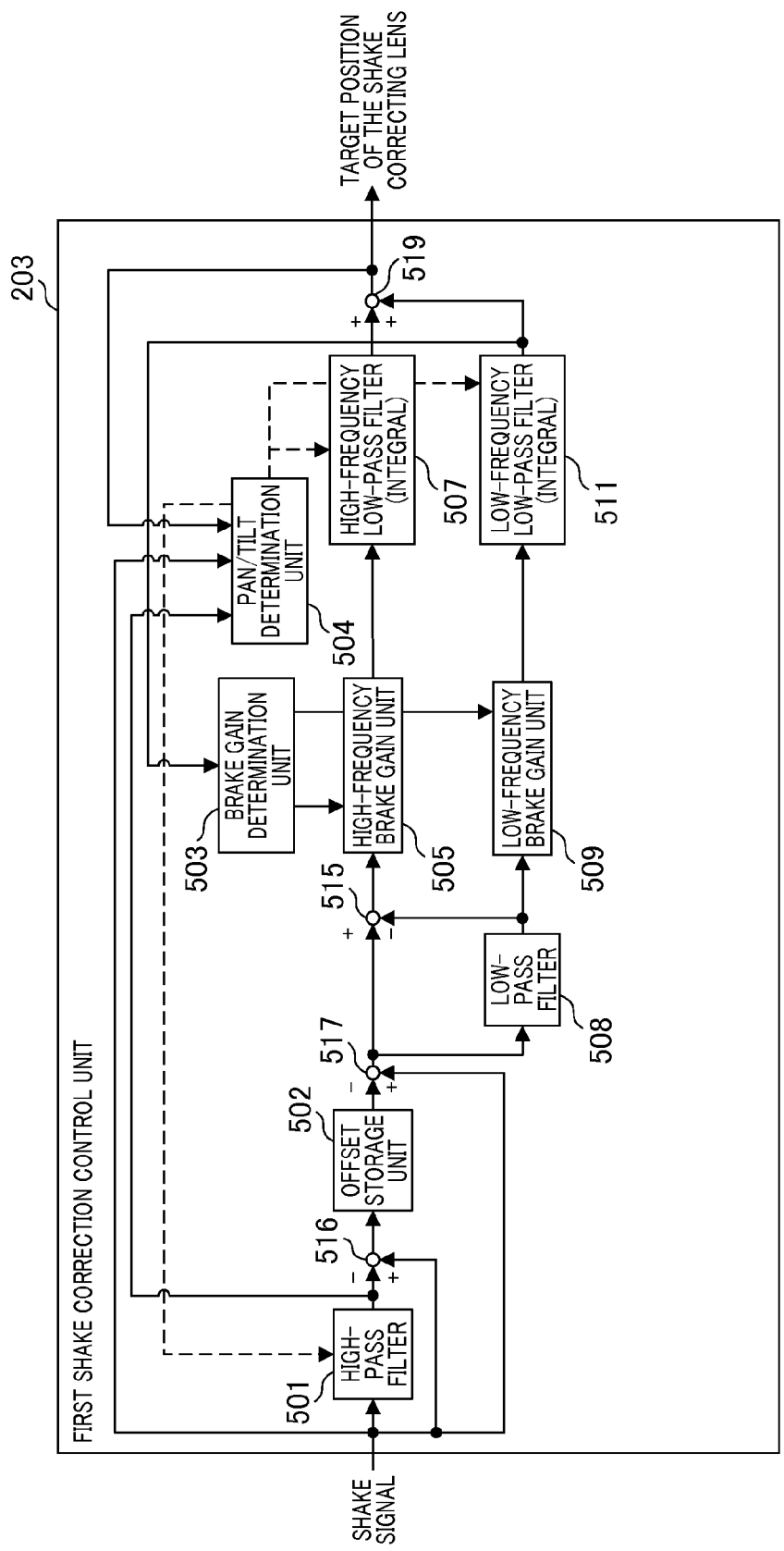
FIG. 8 is a block diagram illustrating a configuration inside of a shake correcting control unit associated with processing in a first control method.

Next, a description will be given of a control of the correcting lens in the image pickup apparatus. A description will be given of the first control method referred to FIG. 8. FIG. 8 is a block diagram illustrating a configuration corresponding to the first control method. Note that the components are as explained by using FIG. 4, and thus only some parts associated with the processing in the first control method are described. If the processing by the first control method is performed, the shake signal in which the offset has been removed by the HPF 501 is subtracted from the shake signal before the offset has been removed and the extracted offset components are held in the offset storage unit 502 while updating the components. In addition, the offset components are subtracted from the shake signal output of the first shake sensor 201. The shake signal from which the low-frequency components have been removed is divided after the processing by the high-pass filter into low-frequency components and high-frequency components respectively by the LPF 508 and the subtracting unit 515. The target position of the correcting lens 103 is calculated based on the signals of the low-frequency components and those of the high-frequency components. In other words, the signal of the high-frequency components is output to the high-frequency LPF 507 through the high-frequency brake gain unit 505. Also, the signal of the low-frequency components is output to the low-frequency LPF 511 through the low-frequency brake gain unit 509.

The brake gain determination unit 503 sets the high-frequency brake gain unit 505 and the low-frequency brake gain unit 509 less than 1 time the gain if the target value of the correcting lens 103 at the low-frequency calculated by the low-frequency LPF is greater than or equal to the predetermined value (threshold value). Thereby, the correcting lens 103 can be prevented from being driven out of the drivable range. Also, if a large shake is applied to the image pickup apparatus, the pan/tilt determination unit 504 changes the cut-off frequency of each filter depending on the result of the determination to the higher-pass side in comparison to when it is not panning/tilting. The term "each filter" comprises the HPF 501, the LPF 508, the high-frequency LPF 507, and the low-frequency LPF 511.

As described above, the first control mode removes the low-frequency components from the shake signal by the HPF 501 to perform the multiplication of the brake gain, and the processing for changing the cut-off frequency of the digital filter when the pan/tilt is determined. The drive amount of the correcting lens can be controlled so as not to be excessively increased when a large shake is applied to the image pickup apparatus in order to prevent the correcting lens 103 from being out of the drivable range and improve the performance of the anti-shake (image shake correction) during photographing while walking or the like.

Figure 9:
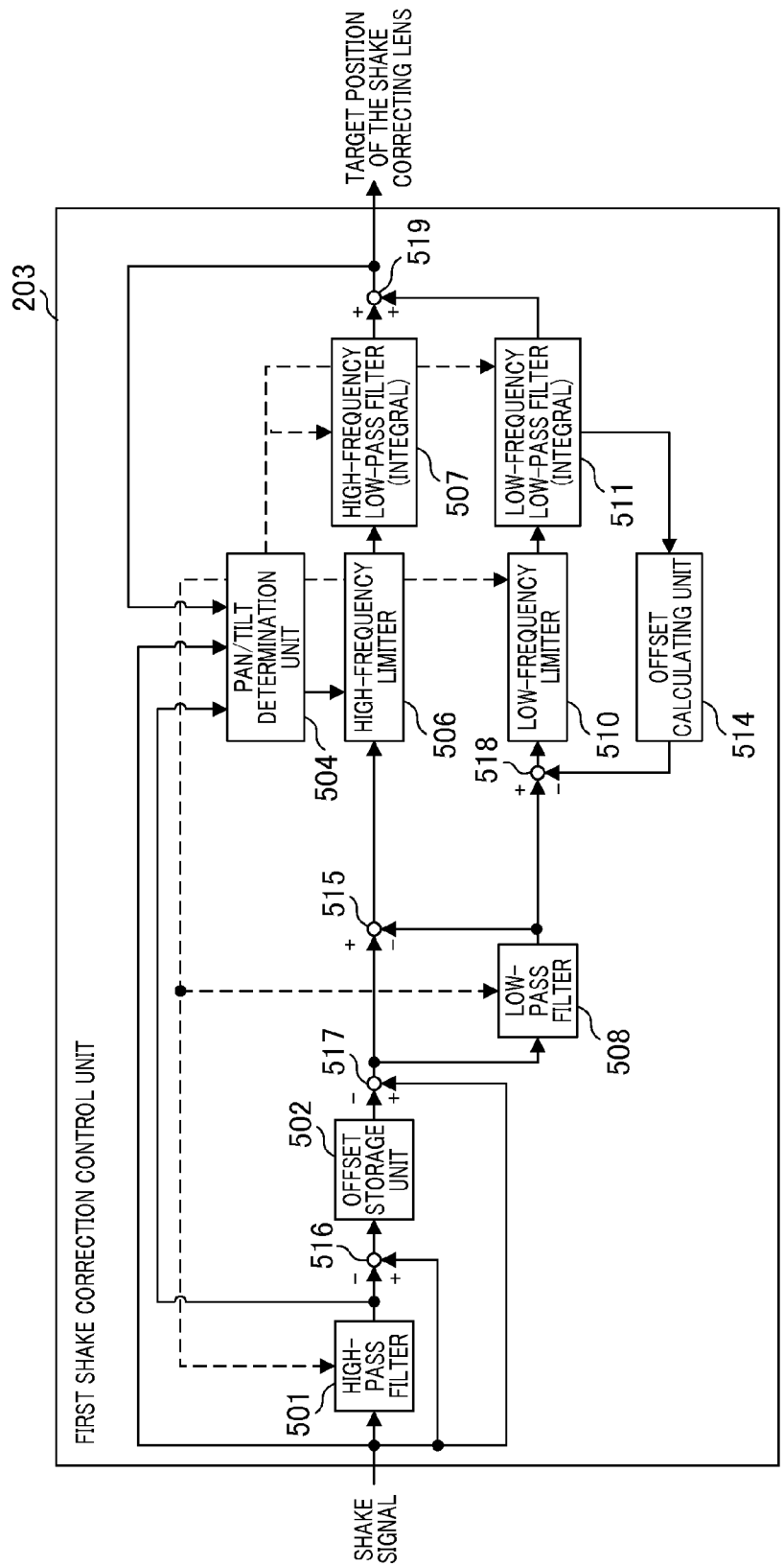
FIG. 9 is a block diagram illustrating a configuration inside of a shake correction control unit associated with processing in a second control method.

Next, a description will be given of a second control method referred to FIG. 9. FIG. 9 is a block diagram illustrating a configuration corresponding to the second control method. Note that the components thereof are as explained by using FIG. 4 and thus, only some parts associated with the processing in the second control method are described. In the second control mode, the shake signal in which the offset has been removed by the HPF 501 is subtracted from the shake signal before removing the offset to extract offset components. The updating of the offset components stops at the timing when the mode is changed to the second control mode, and the offset components are held in the offset storage unit 502. In addition, the fixed value held in the offset storage unit 502 (offset components) is (are) subtracted from the shake signal output by the first shake sensor 201. Hereinafter, without using the high-pass filter, the shake signal from which the offset components have been extracted, which is a fixed value, is divided into each signal of the low-frequency and the high-frequency to calculate the target position of the correcting lens 103 from the divided signals.

Also, each gain value of the high-frequency brake gain unit 505 and the low-frequency brake gain unit 509 is always set to 1 time the gain value depending on the target value of the correcting lens 103 at the low-frequency. In other words, brake processing is not performed (in FIG. 9, the brake gain unit is not illustrated).

The pan/tilt determination unit 504 changes the cut-off frequency of the HPF501 to the high-pass side depending on the result of the determination (1), however, it does not change the cut-off frequency of the LPF 508. Also, the pan/tilt determination unit 504 changes each cut-off frequency of the high-frequency LPF 507 and the low-frequency LPF 511 to the high-pass side depending on the result of the determination (2). Further, in the second control method, the shake amounts input to the high-frequency LPF 507 and the low-frequency LPF 511 are limited by the high-frequency limiter 506 and the low-frequency limiter 510 respectively. The pan/tilt determination unit 504 adds or subtracts the predetermined value from or to the intermediate value calculated in the calculation of each low-pass filter to perform processing for converging the intermediate value to a direction toward 0. The term "each low-pass filter" comprises the LPF 508, the high-frequency LPF 507, and the low-frequency LPF 511.

Figure 11:
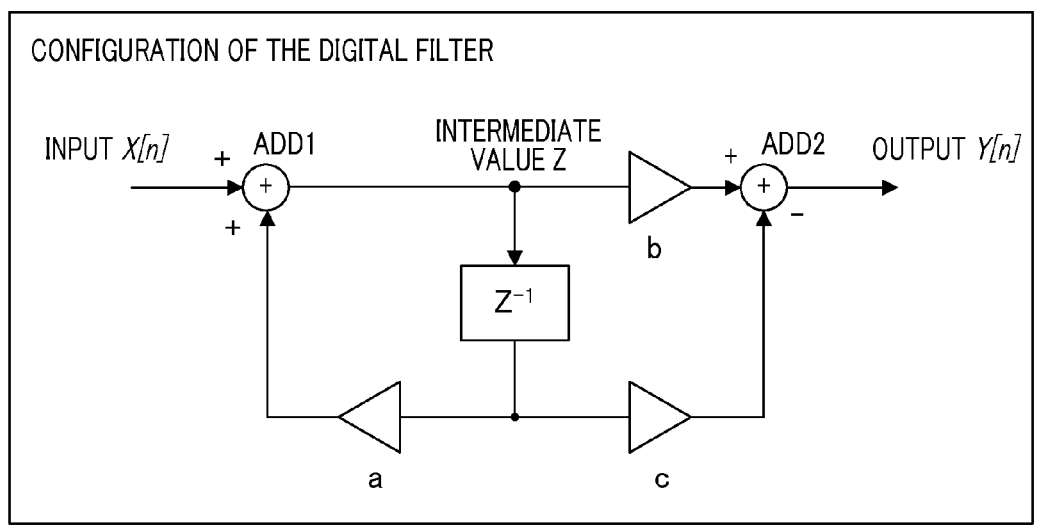
FIG. 11 illustrates a block diagram illustrating an exemplary configuration of a recursive digital filter.

FIG. 11 is a block diagram illustrating a configuration of a recursive primary digital filter. For example, an exemplary configuration thereof consists of adding units ADD1 and ADD2, gain units (multiplication units) a, b, c, and a delay unit (temporary storage unit) Z-1. A sampling time is denoted by n and an input value at this sampling is set to X[n], and an intermediate value at the previous sampling is set to Z[n−1]. A intermediate value at this sampling is set to Z[n]. The input value X[n] and the output of the gain unit are added in the adding unit ADD1, the intermediate value Z[n] is calculated, and the result is stored in the delay unit Z-1. The intermediate value Z[n] that is a stored value in the filter calculation is output to the adding unit ADD2 through the gain unit b. The adding unit ADD2 adds the negative output of the gain unit c to the output of the gain unit b. This output of the gain unit c is an output of the signal for multiplying a gain factor by the intermediate value Z[n−1] at the previous sampling. Therefore, an output value Y[n] at this sampling is calculated from the intermediate value Z[n] at this sampling and the intermediate value Z[n−1] at the previous sampling. In the present embodiment, factors of the each gain unit for determining the gain and the phase characteristic at the frequency of the digital filter (gain factors) are denoted by a, b, and c respectively.

A method for reducing the intermediate value directly is less dependent on the set time constant of the cut-off frequency than the method for changing the cut-off frequency of the digital filter to the high-frequency side. Therefore, the method has some advantages comprising allowing the speed at which the intermediate value converges to 0 to be controlled easily and reduce the swing-back of the filter after the end of the panning processing or the tilting processing.

As described above, the processing in the second control method does not use the HPF 501 for removing the low-frequency components from the shake signal (provided that the initial setting is excluded). Also, the processing has a configuration without generating the swing-back of the filter due to the multiplication of the brake gain or the processing for changing the cut-off frequency of the digital filter at the determination of the panning/tilting. Therefore, this processing can prevent the correcting lens 103 from being driven out of the drivable range to the large swing during a short time due to the panning operation or the like while reducing the change of the photographing image due to the swing-back of the output of the digital filter after the end of the panning operation or the like to output the image without a feeling of wrongness accordingly.

The present embodiment divides a shake signal into each component of the low-frequency and the high-frequency, performs signal processing to each component separately, and combines each of the signals to calculate the combined signal as a target position of the correcting lens. Switching processing whether the signal from the shake signal after the low-pass has been removed by the HPF is used or not is carried out depending on the moving image photographing mode, the still image photographing mode, or the standby state of the still image photographing mode, the photographing conditions such as the photographing magnification or the focal length, or the shake state of the image pickup apparatus during the panning/tilting or the like.

In the prior art, processing is applied for attenuating a signal such that the correcting lens does not follow an unnecessary signal other than the hand shaking of the panning operation regardless of the photographing condition. However, this processing has a possibility that the performance of the shake correction will be reduced for the large frequency with significant influences the handshaking that is originally necessary. In an embodiment of the present invention, if it is in the state of photographing with a large shake signal (photographing while walking), the processing for dividing the frequency is performed on the shake signal processed by the high-pass filter to remove the shake signal of the low-frequency. A plurality of signals divided into frequencies is used to carry out the processing of the image shake correction. The processing for performing the image shake correction by using the plurality of signals divided into frequencies is carried out without using the high-pass filter to reduce the swing-back at the photographing of the moving image or that with the high magnification that has noticeable swing-back due to the panning operation or the like. The present embodiment can remove the influence of the swing-back of the photographing image without reducing the effect of the image shake correction at the photographing while walking and also the effect of the correction to the hand shaking or the like during panning/tilting or immediately after these. Accordingly, this embodiment can realize the excellent image shake correction if a large shake occurs while photographing when walking or the panning operation or the like. Note that the present embodiment illustrates an example for dividing the shake detection signal into two types of components, that is the high-frequency components and the low-frequency components, however, the present invention can also be adapted to a configuration for dividing the signal into a number of frequency components greater than or equal to 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257051, filed on Dec. 12, 2013, which is hereby incorporated by reference herein in its entirety.

What is claimed is:

1. An image shake correcting apparatus for performing an image shake correction, the image shake correcting apparatus comprising:
 a processor that executes a computer program stored in a memory to control the image shake correcting apparatus to function as units comprising:
 (1) a high-pass filter configured to remove a low-pass component of a shake detection signal;
 (2) a dividing unit configured to divide a signal into a low-frequency component and a high-frequency component; and
 (3) a controlling unit configured to provide control modes comprising (a) a first control mode for performing the image shake correction by using a signal obtained by dividing, by the dividing unit, the shake detection signal processed by the high-pass filter, and (b) a second control mode for performing the image shake correction by using a signal obtained by dividing, by the dividing unit, the shake detection signal not processed by the high-pass filter, and
 wherein the controlling unit comprises:
 (a) a first low-pass filter having a variable converging time constant of a filter calculation while integrating the high-frequency component;
 (b) a second low-pass filter having a variable converging time constant of a filter calculation while integrating the low-frequency component;
 (c) a combining unit configured to add outputs of the first low-pass filter and the second low-pass filter and to output a control signal of a target position of a correcting unit; and
 (d) a determining unit configured to obtain the shake detection signal processed by the high-pass filter to determine a switching between the first control mode and the second control mode.

2. The image shake correcting apparatus according to claim 1, wherein the dividing unit comprises:
 a third low-pass filter for extracting the low-frequency component; and
 a subtracting unit configured to subtract the low-frequency component extracted by the third low-pass filter from the signal and to output the high-frequency component.

3. The image shake correcting apparatus according to claim 1, wherein the controlling unit multiplies a gain of less than 1 for each signal of the low-frequency component and the high-frequency component divided by the dividing unit, if the output of the second low-pass filter is greater than or equal to a threshold value in the first control mode.

4. An optical apparatus comprising the image shake correcting apparatus according to claim 1.

5. An image pickup apparatus comprising the image shake correcting apparatus according to claim 1.

6. The image pickup apparatus according to claim 5, wherein the processor executes the computer program stored in the memory to control the image shake correcting apparatus to further function as a position controlling unit configured to obtain the shake detection signal to determine a target position of a correcting lens and to perform feedback control for converging a position of the correcting lens to the target position, the correcting lens being movable in a direction different from an optical axis of a photographing optical system of the image pickup apparatus.

7. The image pickup apparatus according to claim 6, wherein the controlling unit determines a photographing condition or a shake state of the image pickup apparatus, and in accordance with the determination, selects a control mode from among the first control mode and the second control mode.

8. The image pickup apparatus according to claim 6, wherein the controlling unit selects the first control mode if a photographing condition is in a still image photographing mode or a still image photographing standby mode, or if a photographing magnification is less than a threshold value.

9. The image pickup apparatus according to claim 6, wherein the controlling unit selects the second control mode if a photographing condition is in neither a still image photographing mode nor a still image photographing standby mode, or if a photographing magnification is greater than or equal to the threshold value.

10. The image pickup apparatus according to claim 6, wherein the controlling unit selects the second control mode, if the output of the high-pass filter is less than a threshold value.

11. The image pickup apparatus according to claim 6, wherein the determining unit is configured to determine a panning or a tilting operation, and
 wherein the controlling unit selects the second control mode if the image pickup apparatus is not performing the panning or the tilting operation as determined by the determining unit.

12. An image shake correcting apparatus for performing an image shake correction, the image shake correcting apparatus comprising:
 a processor that executes a computer program stored in a memory to control the image shake correcting apparatus to function as units comprising:
 (1) a high-pass filter configured to remove a low-pass component of a shake detection signal;
 (2) a controlling unit configured to provide control modes comprising (a) a first control mode for performing the image shake correction by using the shake detection signal processed by the high-pass filter, and (b) a second control mode for performing the image shake correction by using the shake detection signal not processed by the high-pass filter, wherein the controlling unit holds, in a storing unit, a first subtraction value obtained by subtracting the output of the high-pass filter from the shake detection signal, and wherein the controlling unit performs the image shake correction by using a second subtraction value obtained by subtracting, from the shake detection signal, an offset amount calculated by using the first subtraction value, if a mode of the controlling unit is changed from the first control mode to the second control mode.

13. A control method for performing an image shake correction by an image shake correcting apparatus, the method comprising:

removing, by a high-pass filter, a low-pass component of a shake detection signal;

dividing, by a dividing unit, a signal into a low-frequency component and a high-frequency component;

switching, by a controlling unit, between (a) a first control mode for performing an image shake correction by using a signal obtained by dividing, by the dividing unit, the shake detection signal processed by the high-pass filter, and (b) a second control mode for performing the image shake correction by using a signal obtained by dividing, by the dividing unit, the shake detection signal not processed by the high-pass filter, and wherein the controlling unit comprises:
(a) a first low-pass filter having a variable converging time constant of a filter calculation while integrating the high-frequency component;
(b) a second low-pass filter having a variable converging time constant of a filter calculation while integrating the low-frequency component;
(c) a combining unit configured to add outputs of the first low-pass filter and the second low-pass filter and to output a control signal of a target position of a correcting unit; and
(d) a determining unit configured to obtain the shake detection signal processed by the high-pass filter to determine a switching between the first control mode and the second control mode.

14. A control method for performing an image shake correction by an image shake correcting apparatus, the method comprising:

removing, by a high-pass filter, a low-pass component of a shake detection signal;

switching, by a controlling unit, between (a) a first control mode for performing an image shake correction by using the shake detection signal processed by the high-pass filter, and (b) a second control mode for performing the image shake correction by using the shake detection signal not processed by the high-pass filter, wherein the controlling unit holds, in a storing unit, a first subtraction value obtained by subtracting the output of the high-pass filter from the shake detection signal, and wherein the controlling unit performs the image shake correction by using a second subtraction value obtained by subtracting, from the shake detection signal, an offset amount calculated by using the first subtraction value, if a mode of the controlling unit is changed from the first control mode to the second control mode.

15. An image shake correcting apparatus for performing an image shake correction, the image shake correcting apparatus comprising:

a processor that executes a computer program stored in a memory to control the image shake correcting apparatus to function as units comprising:
(1) a high-pass filter configured to remove a low-pass component of a shake detection signal;
(2) a dividing unit configured to divide a signal into a low-frequency component and a high-frequency component; and
(3) a controlling unit configured to provide a first control mode for performing the image shake correction by using a signal obtained by dividing, by the dividing unit, the shake detection signal processed by the high-pass filter, and wherein the controlling unit comprises:
(a) a first low-pass filter having a variable converging time constant of a filter calculation while integrating the high-frequency component;
(b) a second low-pass filter having a variable converging time constant of a filter calculation while integrating the low-frequency component; and
(c) a combining unit configured to add outputs of the first low-pass filter and the second low-pass filter and to output a control signal of a target position of a correcting unit.

16. The image shake correcting apparatus according to claim 15, wherein the controlling unit multiplies a gain of less than 1 for each signal of the low-frequency component and the high-frequency component divided by the dividing unit, if the output of the second low-pass filter is greater than or equal to a threshold value in the first control mode.

17. A control method for performing an image shake correction by an image shake correcting apparatus, the method comprising:

removing, by a high-pass filter, a low-pass component of a shake detection signal;

dividing, by a dividing unit, a signal into a low-frequency component and a high-frequency component;

selecting, by a controlling unit, a first control mode for performing an image shake correction by using a signal obtained by dividing, by the dividing unit, the shake detection signal processed by the high-pass filter, and wherein the controlling unit comprises:
(1) a first low-pass filter having a variable converging time constant of a filter calculation while integrating the high-frequency component;
(2) a second low-pass filter having a variable converging time constant of a filter calculation while integrating the low-frequency component; and
(3) a combining unit configured to add outputs of the first low-pass filter and the second low-pass filter and to output a control signal of a target position of a correcting unit.

* * * * *